(12) United States Patent
Inagaki

(10) Patent No.: US 11,715,282 B2
(45) Date of Patent: Aug. 1, 2023

(54) DETERMINATION DEVICE, CONTROL METHOD FOR DETERMINATION DEVICE, DETERMINATION SYSTEM, CONTROL METHOD FOR DETERMINATION SYSTEM, AND PROGRAM

(71) Applicant: DAI NIPPON PRINTING CO., LTD., Tokyo-to (JP)

(72) Inventor: Kouji Inagaki, Tokyo-to (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 246 days.

(21) Appl. No.: 17/278,515

(22) PCT Filed: Jun. 16, 2020

(86) PCT No.: PCT/JP2020/023609
§ 371 (c)(1),
(2) Date: Mar. 22, 2021

(87) PCT Pub. No.: WO2020/255965
PCT Pub. Date: Dec. 24, 2020

(65) Prior Publication Data
US 2022/0398860 A1  Dec. 15, 2022

(30) Foreign Application Priority Data
Jun. 17, 2019  (JP) .................. 2019-112226

(51) Int. Cl.
*G06V 10/56* (2022.01)
*G06V 10/28* (2022.01)
(Continued)

(52) U.S. Cl.
CPC ............ *G06V 10/28* (2022.01); *G06T 7/0004* (2013.01); *G06V 10/30* (2022.01); *G06V 10/56* (2022.01);
(Continued)

(58) Field of Classification Search
CPC ........ G06V 10/28; G06V 10/30; G06V 10/56; G06V 30/1444; G06V 30/42; G06V 10/44;
(Continued)

(56) References Cited

U.S. PATENT DOCUMENTS

2005/0161512 A1*  7/2005  Jones ................. H04N 1/32133
                                                          235/487
2008/0002230 A1*  1/2008  Sakaue ................. H04N 1/403
                                                          358/3.27
(Continued)

FOREIGN PATENT DOCUMENTS

JP        2017-215739 A     12/2017

OTHER PUBLICATIONS

May 24, 2022 Extended European Search Report issued in European Patent Application No. 20826096.8.
Aug. 25, 2020 Search Report issued in International Patent Application No. PCT/JP2020/023609.

*Primary Examiner* — Ali Bayat
(74) *Attorney, Agent, or Firm* — Oliff PLC

(57) ABSTRACT

A determination system includes an imaging data acquisition device that captures an image of a printed surface of a printed product to acquire imaging data of the captured image, and a determination device that determines a printing method used to produce the printed surface of the printed product for capturing an image by the imaging data acquisition device. The determination device selects a determination area included in the captured image, extracts a determination end image from a portion around an end portion of a black determination image included in the determination area, acquires difference data that is a difference in gradation between two colors among gradation data of RBG colors of the extracted determination end image, acquires a determination value for determining a printing (Continued)

method used to produce the printed surface of the printed product, and determines a printing method used to produce the printed surface of the printed product.

23 Claims, 8 Drawing Sheets

(51) Int. Cl.
    *G06V 30/14*     (2022.01)
    *G06V 30/42*     (2022.01)
    *G06T 7/00*     (2017.01)
    *G06V 10/30*     (2022.01)

(52) U.S. Cl.
    CPC .......... *G06V 30/1444* (2022.01); *G06V 30/42* (2022.01); *G06T 2207/10024* (2013.01); *G06T 2207/30144* (2013.01)

(58) Field of Classification Search
CPC ......... G06T 7/0004; G06T 2207/10024; G06T 2207/30144; G06T 7/90; G07D 7/005; G07D 7/12; G07D 7/20; B41M 3/14
USPC ......................................................... 382/103
See application file for complete search history.

(56) References Cited

U.S. PATENT DOCUMENTS

| | | | |
|---|---|---|---|
| 2009/0074303 A1* | 3/2009 | Filimonova | G06V 30/412 382/224 |
| 2010/0027851 A1* | 2/2010 | Walther | G07D 7/2041 380/243 |
| 2017/0372134 A1* | 12/2017 | Zagaynov | G06V 10/469 |

* cited by examiner

INPUT IMAGE

Q

EDGE-PORTION-EXTRACTED IMAGE

PRINTING WITH PLATE

PRINTING WITH PRINTER

_DETERMINATION DEVICE, CONTROL
METHOD FOR DETERMINATION DEVICE,
DETERMINATION SYSTEM, CONTROL
METHOD FOR DETERMINATION SYSTEM,
AND PROGRAM_

TECHNICAL FIELD

Embodiments of the present disclosure relate to a determination device that determines a printing method used to produce a printed product. Embodiments of the present disclosure also relate to a control method for the determination device, a determination system, a control method for the determination system, and a program.

BACKGROUND ART

Hitherto, it has been necessary to accurately determine the authenticity of a printed product, namely, a voucher such as a bill or a gift certificate, or an identification card such as a driver's license, a basic resident registration card, a residence card, a special permanent resident certificate, or a passport.

For example, PTL 1 discloses a related-art technique for detecting a difference in the color flatness of a scanned image of an object that is printed with a printer based on an area coverage modulation method such as inkjet printing and determining whether the printed product is one printed using the area coverage modulation method.

However, this related-art technique provides determination of only whether a counterfeit printer is a printer based on an area coverage modulation method such as inkjet printing, and does not provide determination of whether a printed product is a printed product printed by a printing method using a plate such as offset printing or a printed product printed by a printing method using a printer that performs printing through scanning using a driving system.

CITATION LIST

Patent Literature

PTL 1: Japanese Unexamined Patent Application Publication No. 2017-215739

Disclose of Invention

It is an object of embodiments of the present disclosure to provide a determination device, a control method for the determination device, a determination system, a control method for the determination system, and a program, which can effectively address the aforementioned problems.

An embodiment of the present disclosure provides a determination system including an imaging data acquisition device that captures an image of a printed surface of a printed product to acquire imaging data of the captured image, and a determination device that determines, based on the imaging data acquired by the imaging data acquisition device, a printing method used to produce the printed surface of the printed product for which the image is captured by the imaging data acquisition device. The determination device selects a determination area included in the captured image from the imaging data acquired by the imaging data acquisition device, extracts a determination end image from a portion around an end portion of a black determination image included in the selected determination area, acquires difference data, the difference data being a difference in gradation between two colors among gradation data of RBG colors of the extracted determination end image, acquires, based on the acquired difference data, a determination value for determining a printing method used to produce the printed surface of the printed product, and determines, based on the acquired determination value, a printing method used to produce the printed surface of the printed product.

In the determination system according to the embodiment of the present disclosure, the determination device may acquire at least one or more of pieces of the difference data that are differences in gradation between R and B, B and G, and G and R among the gradation data of the RBG colors of the extracted determination end image.

In the determination system according to the embodiment of the present disclosure, the black determination image may be an image of a black character or an image of a black line.

In the determination system according to the embodiment of the present disclosure, the determination device may calculate a variance or standard deviation of the difference data and set the calculated variance or standard deviation as the determination value.

In the determination system according to the embodiment of the present disclosure, the determination device may determine, based on the acquired determination value, whether the printed product is a printed product in which the black determination image is printed in black ink from a plate or a printed product in which the black determination image is printed in multiple colors superimposed on each other by a printing method using a printer.

In the determination system according to the embodiment of the present disclosure, the determination device may extract a plurality of determination end images from the portion around the end portion of the black determination image included in the selected determination area, acquire a plurality of pieces of difference data, the plurality of pieces of difference data being differences in gradation between two colors among gradation data of RBG colors of the extracted plurality of determination end images, acquire, based on the acquired plurality of pieces of difference data, a plurality of determination values corresponding to the plurality of pieces of difference data for determining a printing method used to produce the printed surface of the printed product, and determine, based on the acquired plurality of determination values, a printing method used to produce the printed surface of the printed product.

In the determination system according to the embodiment of the present disclosure, the determination device may determine, based on a maximum value, sum, average, or variance of the plurality of determination values, a printing method used to produce the printed surface of the printed product.

In the determination system according to the embodiment of the present disclosure, the determination device may determine, based on the acquired determination value, whether the printed product is a printed product printed by a printing method using a plate or a printed product printed by a printing method using a printer that performs printing through scanning using a driving system.

In the determination system according to the embodiment of the present disclosure, the determination device may determine that the printed product is a printed product printed with the printer in a case where the determination value is greater than or equal to a preset determination threshold, and determine that the printed product is a printed product printed with the plate in a case where the determination value is less than the determination threshold.

In the determination system according to the embodiment of the present disclosure, the printing method using the printer may be printing using a thermal transfer method such as sublimation transfer.

In the determination system according to the embodiment of the present disclosure, the printer based on the thermal transfer method may print a black (gray) image using a mixture of three colors of CYM (cyan, yellow, and magenta).

In the determination system according to the embodiment of the present disclosure, the imaging data acquisition device may be a mobile phone or a digital camera including an image sensor that acquires the imaging data of an imaging image of the printed surface of the printed product.

In the determination system according to the embodiment of the present disclosure, the printed product may be an original that is printed with the plate, or the printed product may be a counterfeit that is printed with the printer, and the determination device may determine, based on the acquired determination value, whether the printed product is an original printed product printed by a printing method using the plate or a counterfeit printed product printed by a printing method using the printer.

In the determination system according to the embodiment of the present disclosure, the determination device may receive the imaging data acquired by the imaging data acquisition device via the Internet.

In the determination system according to the embodiment of the present disclosure, the determination device may transmit a determination result of a printing method used to produce the printed surface of the printed product to an external device via the Internet.

In the determination system according to the embodiment of the present disclosure, the determination device may transmit a determination result of a printing method used to produce the printed surface of the printed product to the imaging data acquisition device via the Internet.

In the determination system according to the embodiment of the present disclosure, the printed product may be a voucher or a certificate document such as a gift certificate, a bill, a basic resident registration card, a residence card, a special permanent resident certificate, a driver's license, or a passport.

An embodiment of the present disclosure provides a control method for a determination system including an imaging data acquisition device that captures an image of a printed surface of a printed product to acquire imaging data of the captured image, and a determination device that determines, based on the imaging data acquired by the imaging data acquisition device, a printing method used to produce the printed surface of the printed product for which the image is captured by the imaging data acquisition device. The control method includes, by the determination device, selecting a determination area included in the captured image from the imaging data acquired by the imaging data acquisition device, extracting a determination end image from a portion around an end portion of a black determination image included in the selected determination area, acquiring difference data, the difference data being a difference in gradation between two colors among gradation data of RBG colors of the extracted determination end image, acquiring, based on the acquired difference data, a determination value for determining a printing method used to produce the printed surface of the printed product, and determining, based on the acquired determination value, a printing method used to produce the printed surface of the printed product.

An embodiment of the present disclosure provides a determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device. The determination device selects a determination area included in the captured image from the imaging data acquired by the imaging data acquisition device, extracts a determination end image from a portion around an end portion of a black determination image included in the selected determination area, acquires difference data, the difference data being a difference in gradation between two colors among gradation data of RBG colors of the extracted determination end image, acquires, based on the acquired difference data, a determination value for determining a printing method used to produce the printed surface of the printed product, and determines, based on the acquired determination value, a printing method used to produce the printed surface of the printed product.

An embodiment of the present disclosure provides a control method for a determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device. The control method includes, by the determination device, selecting a determination area included in the captured image from the imaging data acquired by the imaging data acquisition device, extracting a determination end image from a portion around an end portion of a black determination image included in the selected determination area, acquiring difference data, the difference data being a difference in gradation between two colors among gradation data of RBG colors of the extracted determination end image, acquiring, based on the acquired difference data, a determination value for determining a printing method used to produce the printed surface of the printed product, and determining, based on the acquired determination value, a printing method used to produce the printed surface of the printed product.

An embodiment of the present disclosure provides a program to be executed by a determination device to be used in a determination system including an imaging data acquisition device that captures an image of a printed surface of a printed product to acquire imaging data of the captured image, the determination device including a computer. The program causes the computer to execute processing including, by the determination device, selecting a determination area included in the captured image from the imaging data acquired by the imaging data acquisition device, extracting a determination end image from a portion around an end portion of a black determination image included in the selected determination area, acquiring difference data, the difference data being a difference in gradation between two colors among gradation data of RBG colors of the extracted determination end image, acquiring, based on the acquired difference data, a determination value for determining a printing method used to produce the printed surface of the printed product, and determining, based on the acquired determination value, a printing method used to produce the printed surface of the printed product.

According to embodiments of the present disclosure, it is possible to determine whether a printed product is a printed product printed by a printing method using a plate or a printed product printed by a printing method using a printer that performs printing through scanning using a driving system.

DESCRIPTION OF EMBODIMENTS

Figure 1:
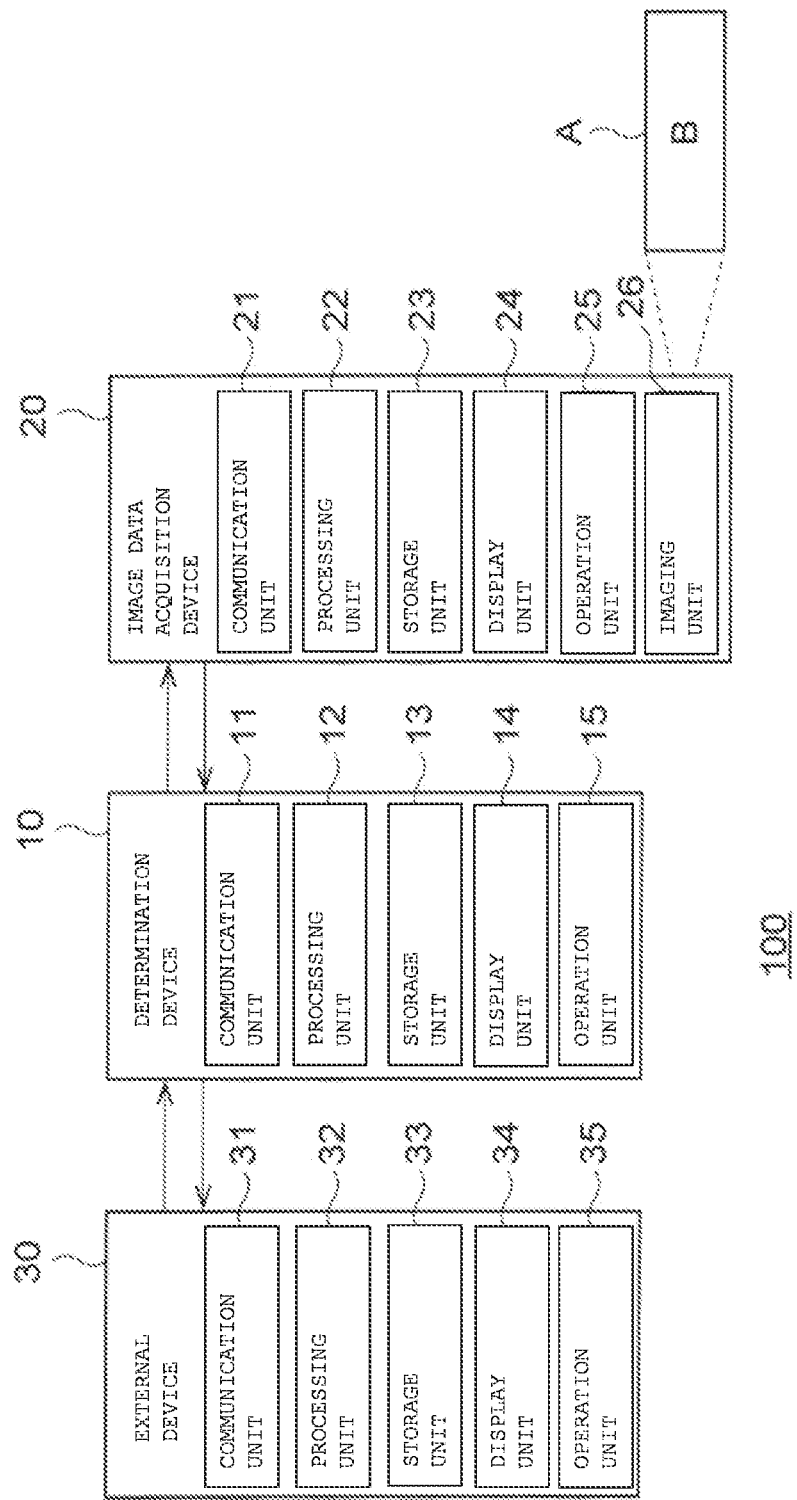
FIG. 1 is a configuration diagram illustrating a configuration of a determination system 100 according to an embodiment.

The following describes a configuration of a determination device and a control method therefor according to embodiments of the present disclosure in detail with reference to the drawings. Embodiments described below are examples of embodiments of the present disclosure, and the present disclosure should not be construed as being limited to these embodiments. As used herein, terms such as "parallel" and "orthogonal", values of length and angle, and the like used to specify shapes and geometric conditions and degrees thereof are not limited to exact meanings, and are construed to the extent that similar functions can be expected. In addition, in the drawings referred to in the embodiments, the same portions or portions having similar functions are assigned the same reference numerals or similar reference numerals, and repeated descriptions thereof are omitted in some cases. In addition, dimensional ratios in the drawings may be different from actual ratios for convenience of description, or a portion of the configuration may be omitted from the drawings.

The following describes an embodiment of the present disclosure with reference to FIGS. 1 to 11B.

[Determination System]

Figure 2:
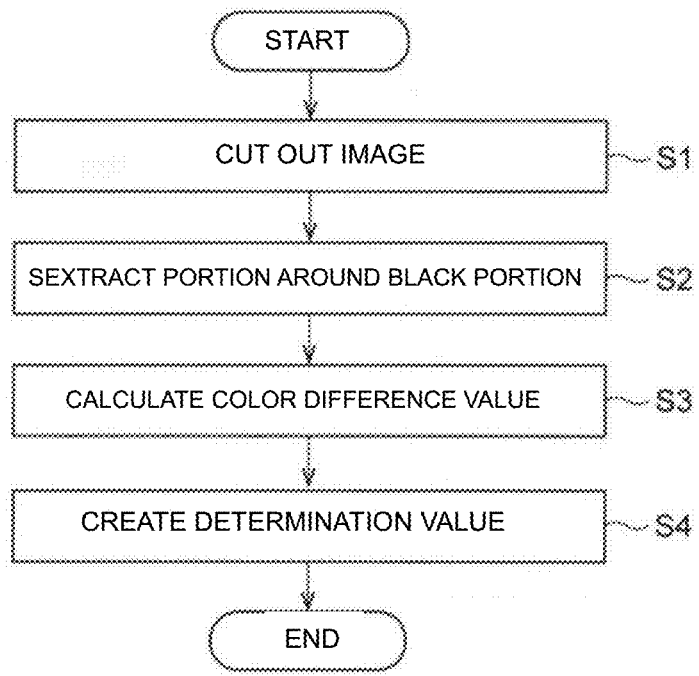
FIG. 2 is a flowchart illustrating an example control method for the determination system 100 (determination device 10) illustrated in FIG. 1.

FIG. 1 is a configuration diagram illustrating a configuration of a determination system 100 according to an embodiment. FIG. 2 is a flowchart illustrating an example control method for the determination system 100 (determination device 10) illustrated in FIG. 1. The process illustrated in FIG. 2 is implemented mainly by a processing unit 12 of the determination device 10 executing a program prepared in advance.

For example, as illustrated in FIG. 1, the determination system 100 includes the determination device 10, an imaging data acquisition device 20, and an external device 30. In the determination system 100 illustrated in FIG. 1, the external device 30 may be omitted as necessary.

[Imaging Data Acquisition Device]

The imaging data acquisition device 20 is configured to capture an image of a printed surface B of a printed product A and acquire imaging data of the captured image. The imaging data acquired by the imaging data acquisition device 20 is transmitted to the processing unit 12 of the determination device 10 through a communication unit 21 of the imaging data acquisition device 20 and a communication unit 11 of the determination device 10 via wireless communication such as the Internet. The printed product A is, for example, a gift certificate, a bill, a driver's license, a basic resident registration card, a residence card, a special permanent resident certificate, a passport, or the like.

For example, as illustrated in FIG. 1, the imaging data acquisition device 20 includes the communication unit 21, a processing unit 22, a storage unit 23, a display unit 24, an operation unit 25, and an imaging unit 26. The components of the imaging data acquisition device 20 illustrated in FIG. 1 are illustrative, and some of the components may be omitted as necessary, or any other component may be added.

The communication unit 21 is configured to transmit and receive predetermined data and the like to and from the communication unit 11 of the determination device 10 via wireless communication such as the Internet. If necessary, the communication unit 21 may be configured to transmit and receive predetermined data and the like to and from the communication unit 11 via wired communication.

The processing unit 22 is constituted by, for example, a computer such as a CPU and is configured to execute processing necessary for the imaging data acquisition device 20, including control of the operation of the imaging unit 26.

The storage unit 23 stores, for example, a program of processing to be executed by the processing unit 22 of the imaging data acquisition device 20 and data necessary for the processing. The storage unit 23 is configured to temporarily save imaging data generated by the imaging unit 26.

The display unit 24 is, for example, a display that displays content and the like executed by the processing unit 22 of the imaging data acquisition device 20.

The operation unit 25 is, for example, an input device to be operated by the user of the imaging data acquisition device 20, and the imaging data acquisition device 20 is configured to cause the processing unit 22 to execute processing corresponding to the operation.

The imaging unit 26 is configured to capture an image of the printed surface B of the printed product A and acquire imaging data of the captured image. The imaging unit 26 is, for example, an image sensor.

The imaging data acquisition device 20 is, for example, a mobile phone (smartphone) or a digital camera including an image sensor (the imaging unit 26) that acquires imaging data of an imaging image of the printed surface B of the printed product A. The imaging data is, for example, gradation data of RGB colors.

[Determination Device]

The determination device 10 is configured to determine a printing method used to produce the printed surface B of the printed product A, for which an image is captured by the imaging data acquisition device 20, on the basis of the imaging data acquired by the imaging data acquisition device 20.

For example, as illustrated in FIG. 2, the determination device 10 is configured to select a determination area included in the captured image (cut out an image) from the imaging data acquired by the imaging data acquisition device 20 (step S1 in FIG. 2).

Then, the determination device 10 is configured to extract a determination end image (color noise) from a portion (edge portion) around an end portion of a black determination image included in the selected determination area (extract a portion around a black portion) (step S2 in FIG. 2).

The black determination image described above is, for example, an image of a black character or an image of a black line.

Then, the determination device 10 is configured to acquire (calculate) difference data that is a difference in gradation between two colors among gradation data of RBG colors of the extracted determination end image (extract a color difference value) (step S3 in FIG. 2).

In particular, the determination device 10 is configured to acquire (calculate) at least one or more of pieces of difference data that are differences in gradation between R and B, B and G, and G and R among the gradation data of RBG colors of the extracted determination end image.

Then, the determination device 10 is configured to acquire (create), based on the acquired difference data, a determination value for determining a printing method used to produce the printed surface B of the printed product A (step S4 in FIG. 2).

In particular, the determination device 10 is configured to calculate the variance or standard deviation of the difference data and set the calculated variance or standard deviation as the determination value. The determination value is desirably calculated using a method that is not affected by the DC component (mean value), such as frequency analyze or the amount of change (difference from adjacent data).

Then, the determination device 10 is configured to determine, based on the acquired determination value, a printing method used to produce the printed surface B of the printed product A.

In particular, the processing unit 12 of the determination device 10 is configured to determine, based on the acquired determination value, whether the printed product A is a printed product A in which the black determination image is printed in black ink from a plate or a printed product A in which the black determination image is printed in multiple colors superimposed on each other by a printing method using a printer.

The determination device 10 may be configured to extract a plurality of determination end images (color noise) from a portion (edge portion) around an end portion of a black determination image included in the selected determination area. In this case, the determination device 10 is configured to acquire (calculate) a plurality of pieces of difference data that are differences in gradation between two colors among gradation data of RBG colors of the extracted plurality of determination end images. Then, the determination device 10 acquires, based on the acquired plurality of pieces of difference data, a plurality of determination values corresponding to the plurality of pieces of difference data for determining a printing method used to produce the printed surface B of the printed product A, and determines, based on the acquired plurality of determination values, a printing method used to produce the printed surface B of the printed product A.

In the case of extracting a plurality of determination end images (color noise) in the way described above, for example, the determination device 10 may be configured to determine, based on the maximum value, sum, average, or variance of the plurality of determination values described above, a printing method used to produce the printed surface B of the printed product A.

For example, as illustrated in FIG. 1, the determination device 10 includes the communication unit 11, the processing unit 12, a storage unit 13, a display unit 14, and an operation unit 15. The components of the determination device 10 illustrated in FIG. 1 are illustrative, and some of the components may be omitted as necessary, or any other component may be added.

The communication unit 11 is configured to transmit and receive predetermined data and the like to and from the communication unit 21 of the imaging data acquisition device 20 or a communication unit 31 of the external device 30 via wireless communication such as the Internet. If necessary, the communication unit 11 may be configured to transmit and receive predetermined data and the like to and from the communication units 21 and 31 via wired communication.

The display unit 14 is, for example, a display that displays the result of determination executed by the processing unit 12 of the determination device 10.

The operation unit 15 is an input device to be operated by the user of the determination device 10, and the determination device 10 is configured to cause the processing unit 12 to execute processing corresponding to the operation.

The processing unit 12 is constituted by, for example, a computer such as a CPU and is configured to execute processing necessary for the determination device 10.

The processing unit 12 is configured to receive the imaging data acquired by the imaging data acquisition device 20 using the communication unit 11 via the Internet.

The processing unit 12 is configured to, for example, select a determination area included in the captured image from the imaging data acquired by the imaging data acquisition device 20 (step S1 in FIG. 2), extract a determination end image (color noise) from a portion (edge portion) around an end portion of a black determination image included in the selected determination area (step S2 in FIG. 2), acquire (calculate) difference data that is a difference in gradation between two colors among gradation data of RBG colors of the extracted determination end image (step S3 in FIG. 2), acquire, based on the acquired difference data, a determination value for determining a printing method used to produce the printed surface B of the printed product A (step S4 in FIG. 2), and determine, based on the acquired determination value, a printing method used to produce the printed surface B of the printed product A.

The storage unit 13 stores a program of processing to be executed by the processing unit 12 of the determination device 10 and data necessary for the processing.

The program is a program to be executed by the determination device 10 including at least a computer (the processing unit 12) and is configured to cause the computer (the processing unit 12) to execute processing including selecting a determination area included in the captured image from the imaging data acquired by the imaging data acquisition device 20 (step S1 in FIG. 2), extracting a determination end image (color noise) from a portion (edge portion) around an end portion of a black determination image included in the selected determination area (step S2 in FIG. 2), acquiring (calculating) difference data that is a difference in gradation between two colors among gradation data of RBG colors of the extracted determination end image (step S3 in FIG. 2), acquiring, based on the acquired difference data, a determination value for determining a printing method used to produce the printed surface B of the printed product A (step S4 in FIG. 2), and determining, based on the acquired determination value, a printing method used to produce the printed surface B of the printed product A.

For example, if the determination value described above is greater than or equal to a preset determination threshold (i.e., the color noise in the portion (edge portion) around the end portion of the black determination image is greater than or equal to a predetermined value), the processing unit 12 of the determination device 10 is configured to determine that the printed product A is a printed product printed with the printer described above.

On the other hand, if the determination value described above is less than the determination threshold (i.e., the color noise in the portion (edge portion) around the end portion of the black determination image is less than the predetermined value), the processing unit 12 of the determination device 10 is configured to determine that the printed product A is a printed product printed with the plate described above.

Then, the processing unit 12 of the determination device 10 is configured to determine, based on the acquired determination value described above, whether the printed product A is an original printed product A printed by a printing method using the plate described above or a counterfeit printed product A printed by a printing method using the printer described above.

Then, the processing unit 12 of the determination device 10 is configured to transmit the determination result of the printing method used to produce the printed surface B of the printed product A to the imaging data acquisition device 20 via the Internet.

The processing unit 12 of the determination device 10 may be configured to transmit the determination result of the printing method used to produce the printed surface B of the printed product A to the external device 30 via the Internet by using the communication unit 11.

[External Device]

The external device 30 is, for example, a server that executes necessary processing on the basis of the determination result or the like received from the determination device 10.

For example, as illustrated in FIG. 1, the external device 30 includes the communication unit 31, a processing unit 32, a storage unit 33, a display unit 34, and an operation unit 35. The components of the external device 30 illustrated in FIG. 1 are illustrative, and some of the components may be omitted as necessary, or any other component may be added.

The communication unit 31 is configured to transmit and receive predetermined data and the like to and from the communication unit 11 of the determination device 10 via wireless communication such as the Internet. If necessary, the communication unit 31 may be configured to transmit and receive predetermined data and the like to and from the communication unit 11 via wired communication.

The processing unit 32 is constituted by, for example, a computer such as a CPU and is configured to execute processing necessary for the external device 30.

The storage unit 33 stores a program of processing to be executed by the processing unit 32 of the external device 30 and data necessary for the processing.

The display unit 34 is, for example, a display that displays content and the like executed by the processing unit 32 of the external device 30.

The operation unit 35 is an input device to be operated by the user of the external device 30, and the external device 30 is configured to cause the processing unit 32 to execute processing corresponding to the operation.

[Basic Principle of Determination Method]

The basic principle of the determination method according to this embodiment will now be described. As described above, the determination system 100 according to this embodiment is configured to determine the authenticity of a printed product such as a voucher or an identification card by determining whether the printed product is a printed product printed by a printing method using a plate or a printed product printed by a printing method using a printer that performs printing through scanning using a driving system.

For example, the printed product A, which is original, is printed with a plate on offset printing or the like.

In contrast, the printed product A, which is counterfeit, is generally manufactured using, for example, imaging data obtained by imaging of the original printed product A using a scanner by printing the printed surface of the printed product A with a printer that performs printing by scanning a printing unit (a printhead and a paper feed mechanism) using a driving system (for example, a motor). The printing method using a printer includes, for example, printing using a thermal transfer method such as sublimation transfer. A printer based on the thermal transfer method is configured to, for example, print a black (gray) image using a mixture of three colors of CYM (cyan, yellow, and magenta).

Accordingly, the determination device according to this embodiment determines whether a printed product is a printed product printed by a printing method using a plate or a printed product printed by a printing method using a printer that performs printing through scanning using a driving system, and determines the authenticity of a voucher, an identification card, or the like.

Figure 3:
FIG. 3 is a diagram illustrating an example of a printed surface B of a printed product A.
Figure 4A:
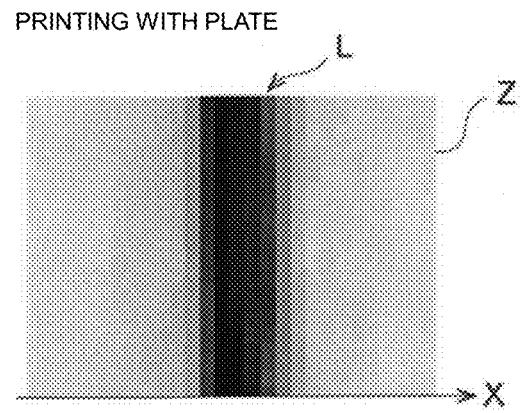
FIG. 4A is an enlarged view of a black image (line) L in an area Z on the printed surface B of the printed product A illustrated in FIG. 3 when the printed product A is printed with a plate using an offset printing method.
Figure 4B:
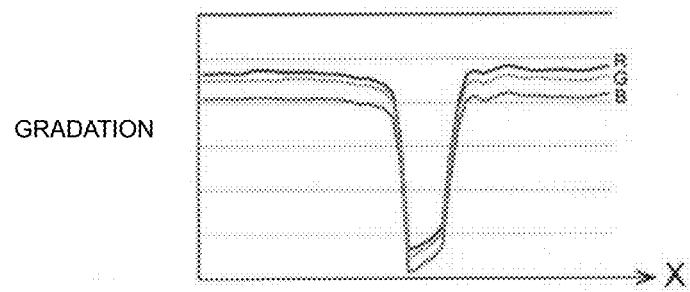
FIG. 4B is a diagram illustrating gradation data of RGB colors of the black image (line) L in the area Z illustrated in FIG. 4A in the X direction.
Figure 4C:
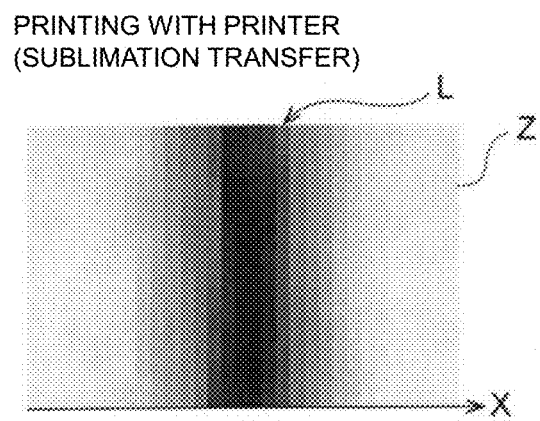
FIG. 4C is an enlarged view of the black image (line) L in the area Z on the printed surface B of the printed product A illustrated in FIG. 3 when the printed product A is printed with a printer based on the thermal transfer method.
Figure 4D:
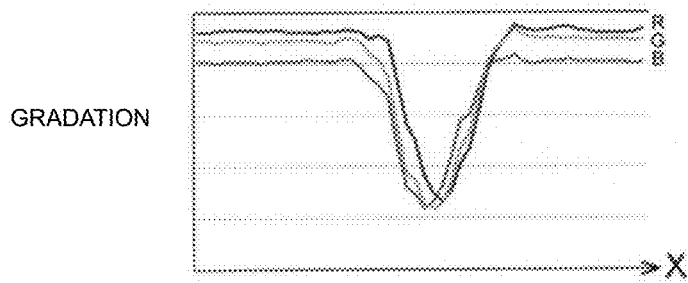
FIG. 4D is a diagram illustrating gradation data of RGB colors of the black image (line) L in the area Z illustrated in FIG. 4C in the X direction.

FIG. 3 is a diagram illustrating an example of the printed surface B of the printed product A. FIG. 4A is an enlarged view of a black image (line) L in an area Z on the printed surface B of the printed product A illustrated in FIG. 3 when the printed product A is printed with a plate using an offset printing method. FIG. 4B is a diagram illustrating gradation data of RGB colors of the black image (line) L in the area Z illustrated in FIG. 4A in the X direction. FIG. 4C is an enlarged view of the black image (line) L in the area Z on the printed surface B of the printed product A illustrated in FIG. 3 when the printed product A is printed with a printer based on the thermal transfer method. FIG. 4D is a diagram illustrating gradation data of RGB colors of the black image (line) L in the area Z illustrated in FIG. 4C in the X direction.

For example, as illustrated in FIG. 3, the printed surface B of the printed product A, which is a gift certificate, includes the area Z having a black-line image L.

For example, as illustrated in FIGS. 4A and 4B, when the printed product A is an original printed by a printing method using a plate using black ink for offset printing or the like, substantially no color noise appears in portions (edge portions) around end portions of the black image (line) L in the area Z on the printed surface B of the printed product A.

In contrast, for example, as illustrated in FIGS. 4C and 4D, when the printed product A is a counterfeit printed by printing with a printer, color noise occurs in the portions (edge portions) around the end portions of the black image (line) L in the area Z on the printed surface B of the printed product A.

A description will now be given of the principle that color noise occurs in the portions (edge portions) around the end portions of the black image (line) L in the area Z on the printed surface B of the printed product A when the printed product A is a counterfeit printed by printing with a printer.

Figure 5A:
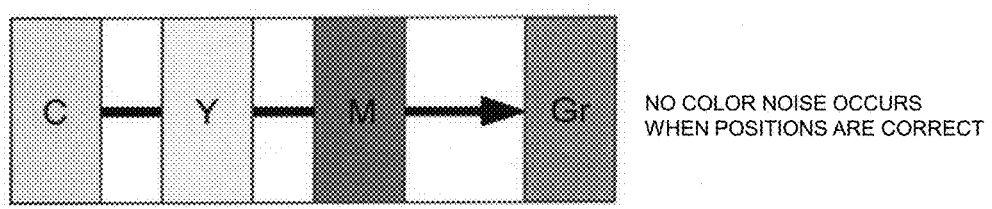
FIG. 5A is a diagram illustrating an example of a black (Gr) image printed with a printer based on the thermal transfer method using a mixture of three colors of CYM (cyan C, yellow Y, and magenta M), in which the positions of the three colors are accurately printed at predetermined positions.
Figure 5B:
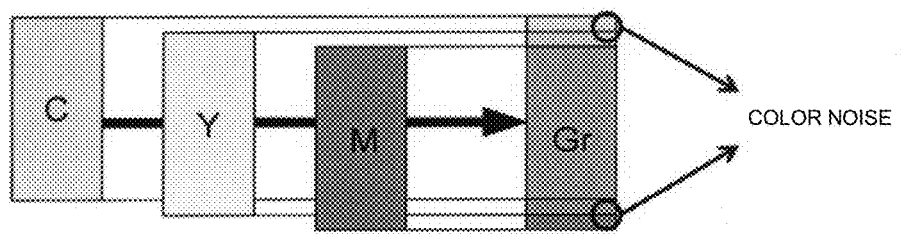
FIG. 5B is a diagram illustrating an example of a black (Gr) image printed with a printer based on the thermal transfer method using a mixture of three colors of CYM (cyan C, yellow Y, and magenta M), in which the positions of the three colors are displaced from the predetermined positions, causing color noise in portions around end portions of the image.

FIG. 5A is a diagram illustrating an example of a black (Gr) image printed with a printer based on the thermal transfer method using a mixture of three colors of CYM (cyan C, yellow Y, and magenta M), in which the positions of the three colors are accurately printed at predetermined positions. FIG. 5B is a diagram illustrating an example of a black (Gr) image printed with a printer based on the thermal transfer method using a mixture of three colors of CYM (cyan C, yellow Y, and magenta M), in which the positions of the three colors are displaced from the predetermined positions, causing color noise in portions around end portions of the image.

As described above, the printer is configured to perform printing by, for example, scanning a printing unit (a printhead and a paper feed mechanism) by using a driving system (for example, a motor).

For example, as illustrated in FIG. 5A, no color noise occurs in a black (Gr) image which is printed with a printer based on the thermal transfer method using a mixture of three colors of CYM (cyan C, yellow Y, and magenta M) and in which the positions of the three colors are accurately printed at predetermined positions.

However, a printhead or a paper feed mechanism for printed products in a printer, which is scanned using a mechanical mechanism such as a motor, may not be scanned with constant velocity. In addition, the following case is predicted: When imaging data of a printed product is loaded into a printer through imaging using a scanner, the scanner may fail to accurately (ideally) load the imaging data of the printed product.

In this case, as illustrated in FIG. 5B, if an image of a black character or an image of a black line is printed on a product to be printed with the scanning speed of the printhead H of the printer being temporarily changed, color noise occurs in portions (edge portions) around end portions of the image of the black character or the image of the black line.

As described above, during the rendering by the printer, the use of the driving system (motor), such as the paper feed mechanism, such as the paper feed mechanism, causes a fine error. As a result, color noise occurs in portions (edge portions) around end portions of an image of a black character or an image of a black line.

Likewise, when the printed surface of the original printed product A is scanned by a scanner to create a forged document, a fine error of a driving system of a sensor causes color noise in portions (edge portions) around end portions of an image of a black character or an image of a black line.

Figure 10A:
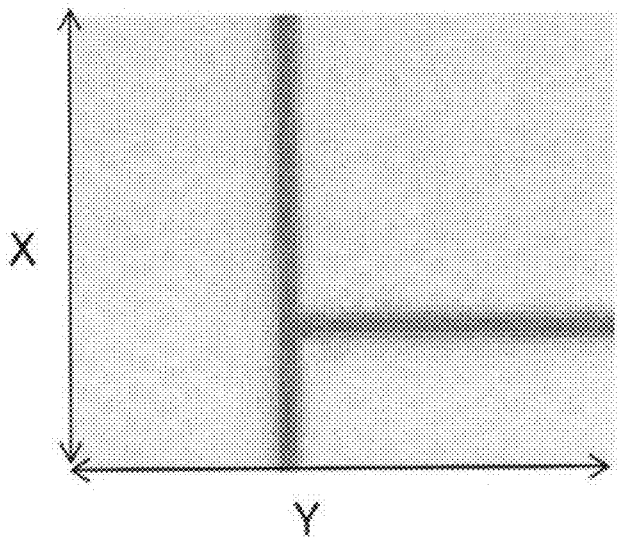
FIG. 10A is an enlarged view of an example black determination image when printed with a plate using black ink.
Figure 11A:
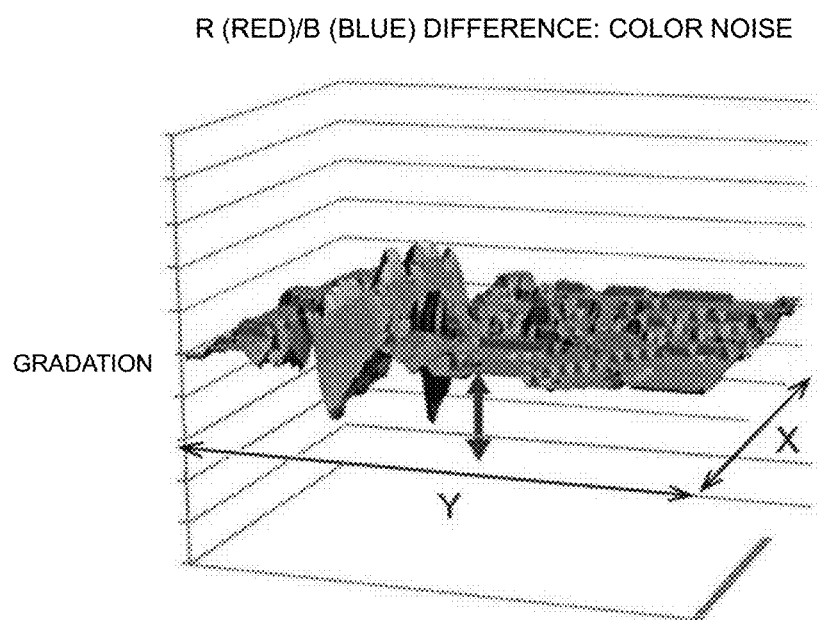
FIG. 11A is a diagram illustrating an example of difference data, which is the difference in gradation between R and B among gradation data of RBG colors of a determination end image in XY directions, corresponding to the black determination image illustrated in FIG. 10A.

As described above, when the printed product A is a counterfeit printed by printing with a printer, color noise occurs in portions (edge portions) around end portions of a black determination image (image of a black character or image of a black line) (as illustrated in FIGS. 10A and 11A described below, the value of color noise is large).

Figure 10B:
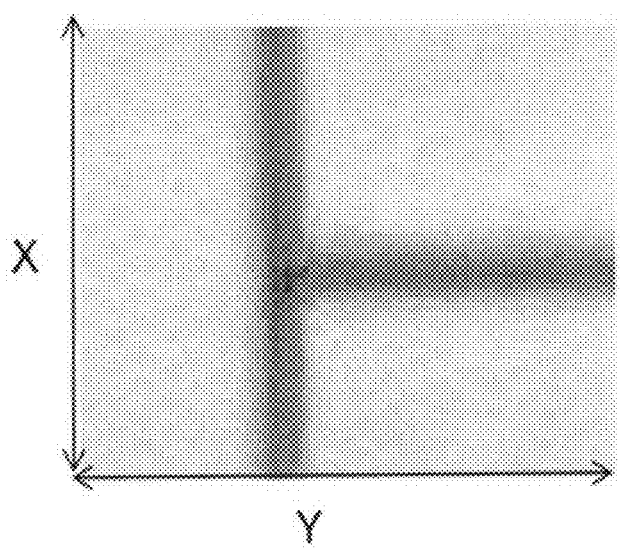
FIG. 10B is an enlarged view of an example black determination image when produced by superimposition printing using a printer.
Figure 11B:
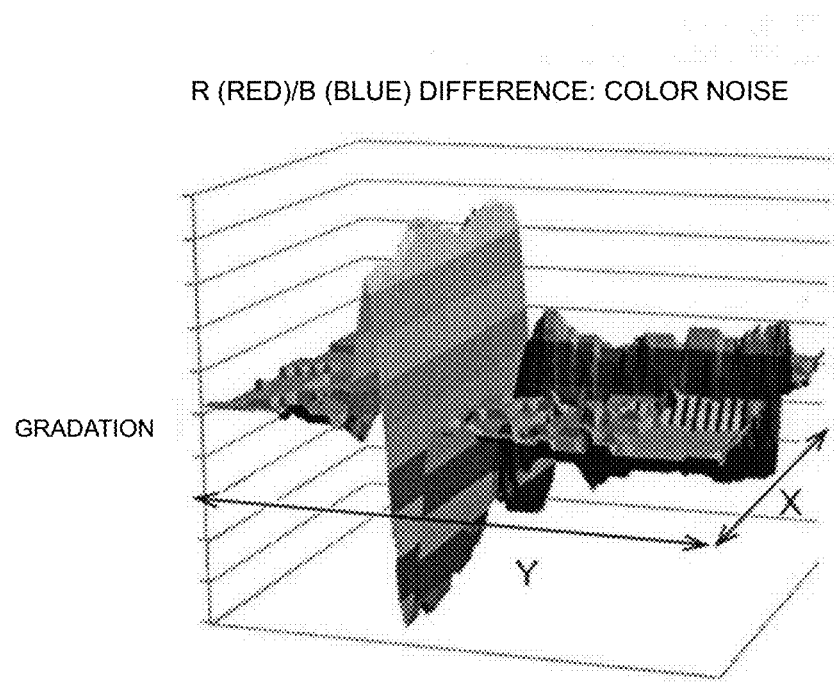
FIG. 11B is a diagram illustrating an example of difference data, which is the difference in gradation between R and B among gradation data of RBG colors of a determination end image in XY directions, corresponding to the black determination image illustrated in FIG. 10B.

In contrast, as described above, when the printed product A is an original printed by a printing method using a plate, no color noise occurs in portions (edge portions) around end portions of a black determination image (image of a black character or image of a black line) (as illustrated in FIGS. 10B and 11B described below, the value of color noise is small).

In this embodiment, therefore, as described above, it is determined whether a printed product is a printed product printed by a printing method using a plate or a printed product printed by a printing method using a printer that performs printing through scanning using a driving system to determine whether the printed product is original or counterfeit.

As described above, the printing method using a printer is, for example, printing using a thermal transfer method such as sublimation transfer.

[Control Method for Determination System]

Next, an example of a control method that is a determination method of the determination system 100, in particular, a control method for a determination device, will be described.

Figure 6:
FIG. 6 is a diagram illustrating an example of a plurality of determination areas Z1 to Z5 on the printed surface B of the printed product A.
Figure 7:
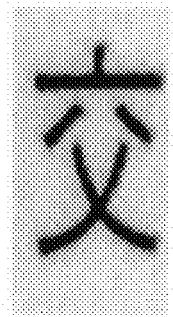
FIG. 7 is a diagram illustrating an example of a black determination image included in the selected determination area Z3 on the printed surface B of the printed product A illustrated in FIG. 6.
Figure 8:
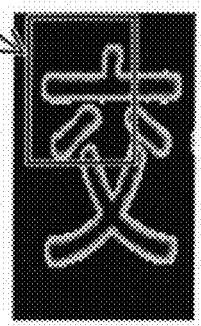
FIG. 8 is a diagram illustrating an example of a determination end image (color noise) extracted from a portion (edge portion) around an end portion of the black determination image included in the selected determination area Z3 illustrated in FIG. 7.
Figure 9A:
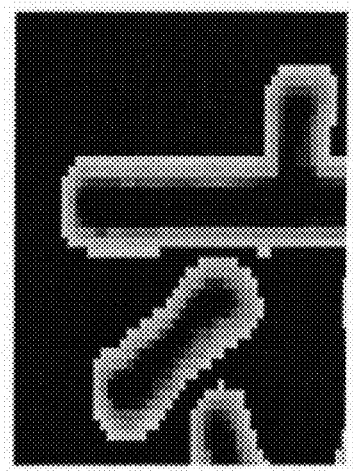
FIG. 9A is an enlarged view of an area Q of the extracted determination end image illustrated in FIG. 8 when printed with a plate.
Figure 9B:
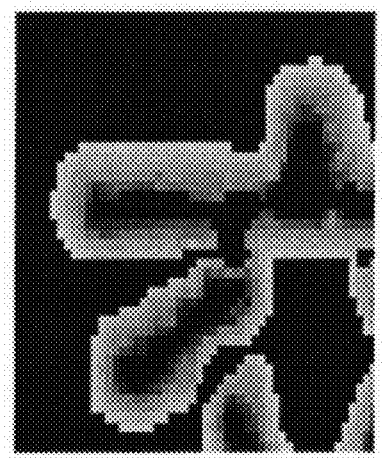
FIG. 9B is an enlarged view of the area Q of the extracted determination end image illustrated in FIG. 8 when printed with a printer.

FIG. 6 is a diagram illustrating an example of a plurality of determination areas Z1 to Z5 on the printed surface B of the printed product A. FIG. 7 is a diagram illustrating an example of a black determination image included in the selected determination area Z3 on the printed surface B of the printed product A illustrated in FIG. 6. FIG. 8 is a diagram illustrating an example of a determination end image (color noise) extracted from a portion (edge portion) around an end portion of the black determination image included in the selected determination area Z3 illustrated in FIG. 7. FIG. 9A is an enlarged view of an area Q of the extracted determination end image illustrated in FIG. 8 when printed with a plate. FIG. 9B is an enlarged view of the area Q of the extracted determination end image illustrated in FIG. 8 when printed with a printer. FIG. 10A is an enlarged view of an example black determination image when printed with a plate using black ink. FIG. 10B is an enlarged view of an example black determination image when produced by superimposition printing using a printer. FIG. 11A is a diagram illustrating an example of difference data, which is the difference in gradation between R and B among gradation data of RBG colors of a determination end image in XY directions, corresponding to the black determination image illustrated in FIG. 10A. FIG. 11B is a diagram illustrating an example of difference data, which is the difference in gradation between R and B among gradation data of RBG colors of a determination end image in XY directions, corresponding to the black determination image illustrated in FIG. 10B.

For example, as illustrated in FIG. 6, the printed surface B of the printed product A, which is a gift certificate, includes areas Z1 to Z5 each having an image of a black character or an image of a black line.

For example, the processing unit 12 of the determination device 10 selects a determination area illustrated in FIG. 7 (area included in the area Z3 illustrated in FIG. 6) included in the captured image from the imaging data acquired by the imaging data acquisition device 20 (corresponding to step S1 in FIG. 2).

Then, as illustrated in FIGS. 8, 9A, and 9B, the processing unit 12 of the determination device 10 extracts a determination end image (color noise) from a portion (edge portion) around an end portion of a black determination image (a portion of the Japanese character "効") included in the selected determination area (corresponding to step S2 in FIG. 2).

As described above, the black determination image is, for example, an image of a black character or an image of a black line. Then, as illustrated in FIGS. 11A and 11B, the processing unit 12 of the determination device 10 acquires (calculates) difference data that is a difference in gradation between two colors among gradation data of RBG colors of the extracted determination end image (corresponding to step S3 in FIG. 2).

In particular, the processing unit 12 of the determination device 10 acquires (calculates) difference data that is differences in gradation between R and B, B and G, and G and R among the gradation data of RBG colors of the extracted determination end image.

Then, the processing unit 12 of the determination device 10 acquires (creates), based on the acquired difference data, a determination value for determining a printing method used to produce the printed surface B of the printed product A (corresponding to step S4 in FIG. 2).

In particular, the determination device 10 calculates the variance or standard deviation of the difference data and sets the calculated variance or standard deviation as the determination value. The determination value is desirably calculated using a method that is not affected by the DC component (mean value), such as frequency analyze or the amount of change (difference from adjacent data).

Then, the processing unit 12 of the determination device 10 determines, based on the acquired determination value, a printing method used to produce the printed surface B of the printed product A.

As described above, a determination value that is not affected by the DC component (mean value) of difference data, such as the variance value of difference data (R-G, G-B, and B-R) of two colors of gradation data of RGB colors of an image, is calculated, which enables determination that is not affected by overall change in color (such as a reddish or bluish image) caused by the image capture environment (light source: sunlight or fluorescent light) or aging of a voucher (due to yellowing or the like).

For example, if the determination value described above is greater than or equal to a preset determination threshold (i.e., as illustrated in FIGS. 9B, 10B, and 11B, the color noise in the portions (edge portions) around the end portions of the black determination image is greater than or equal to a predetermined value) (FIGS. 9B, 10B, and 11B), the processing unit 12 of the determination device 10 determines that the printed product A is a printed product printed with the printer described above.

On the other hand, if the determination value described above is less than the determination threshold (i.e., as illustrated in FIGS. 9A, 10A, and 11A, the color noise in the portions (edge portions) around the end portions of the black determination image is less than the predetermined value) (FIGS. 9A, 10A, and 11A), the processing unit 12 of the determination device 10 determines that the printed product A is a printed product printed with the plate described above.

In this manner, the determination device 10 determines, based on the acquired determination value, whether the printed product A is an original printed product A printed by a printing method using the plate described above or a counterfeit printed product A printed by a printing method using the printer described above.

The processing unit 12 of the determination device 10 transmits the determination result of the printing method used to produce the printed surface B of the printed product A to the imaging data acquisition device 20 (mobile phone) via the Internet.

The determination result of the printing method used to produce the printed surface B of the printed product A is displayed on the display unit 24 of the imaging data acquisition device 20 (mobile phone), which enables the user of the imaging data acquisition device 20 (mobile phone) to be informed of the determination result.

Alternatively, the processing unit 12 of the determination device 10 may transmit the determination result of the printing method used to produce the printed surface B of the printed product A to the external device 30 via the Internet by using the communication unit 11.

The determination result of the printing method used to produce the printed surface B of the printed product A is displayed on the display unit 34 of the external device 30, which enables the user of the imaging data acquisition device 20 (mobile phone) to be informed of the determination result.

As described above, according to embodiments of the present disclosure, it is possible to determine whether a printed product is a printed product printed by a printing method using a plate or a printed product printed by a printing method using a printer that performs printing through scanning using a driving system.

While some modifications of the embodiment described above have been described, it is apparent that a plurality of modifications can be used in combination as appropriate.

REFERENCE SIGNS LIST 100 determination system
10 determination device
20 imaging data acquisition device
30 external device
11 communication unit 12 processing unit
13 storage unit
14 display unit
15 operation unit
21 communication unit
22 processing unit
23 storage unit
24 display unit
25 operation unit
26 imaging unit
31 communication unit
32 processing unit
33 storage unit
34 display unit
35 operation unit

The invention claimed is:

1. A determination system comprising:
an imaging data acquisition device that captures an image of a printed surface of a printed product to acquire imaging data of the captured image; and
a determination device that determines, based on the imaging data acquired by the imaging data acquisition device, a printing method used to produce the printed surface of the printed product for which the image is captured by the imaging data acquisition device,
wherein the determination device
selects a determination area included in the captured image from the imaging data acquired by the imaging data acquisition device,
extracts a determination end image from a portion around an end portion of a black determination image included in the selected determination area,
acquires difference data, the difference data being a difference in gradation between two colors among gradation data of RBG colors of the extracted determination end image,
acquires, based on the acquired difference data, a determination value for determining a printing method used to produce the printed surface of the printed product, and
determines, based on the acquired determination value, a printing method used to produce the printed surface of the printed product.

2. The determination system according to claim 1, wherein the determination device
acquires at least one or more of pieces of the difference data that are differences in gradation between R and B, B and G, and G and R among the gradation data of the RBG colors of the extracted determination end image.

3. The determination system according to claim 1, wherein the black determination image is an image of a black character or an image of a black line.

4. The determination system according to claim 1, wherein the determination device
calculates a variance or standard deviation of the difference data and sets the calculated variance or standard deviation as the determination value.

5. The determination system according to claim 1, wherein the determination device
determines, based on the acquired determination value, whether the printed product is a printed product in which the black determination image is printed in black ink from a plate or a printed product in which the black determination image is printed in multiple colors superimposed on each other by a printing method using a printer.

6. The determination system according to claim 1, wherein the determination device
extracts a plurality of determination end images from the portion around the end portion of the black determination image included in the selected determination area,
acquires a plurality of pieces of difference data, the plurality of pieces of difference data being differences in gradation between two colors among gradation data of RBG colors of the extracted plurality of determination end images,
acquires, based on the acquired plurality of pieces of difference data, a plurality of determination values corresponding to the plurality of pieces of difference data for determining a printing method used to produce the printed surface of the printed product, and
determines, based on the acquired plurality of determination values, a printing method used to produce the printed surface of the printed product.

7. The determination system according to claim 6, wherein the determination device
determines, based on a maximum value, sum, average, or variance of the plurality of determination values, a printing method used to produce the printed surface of the printed product.

8. The determination system according to claim 1, wherein the determination device
determines, based on the acquired determination value, whether the printed product is a printed product printed by a printing method using a plate or a printed product printed by a printing method using a printer that performs printing through scanning using a driving system.

9. The determination system according to claim 8, wherein the determination device
determines that the printed product is a printed product printed with the printer in a case where the determination value is greater than or equal to a preset determination threshold, and
determines that the printed product is a printed product printed with the plate in a case where the determination value is less than the determination threshold.

10. The determination system according to claim 8, wherein the printing method using the printer comprises printing using a thermal transfer method.

11. The determination system according to claim 10, wherein the printer based on the thermal transfer method prints a black image using a mixture of three colors of CYM (cyan, yellow, and magenta).

12. The determination system according to claim 8, wherein the printed product is an original that is printed with the plate, or
the printed product is a counterfeit that is printed with the printer, and
wherein the determination device
determines, based on the acquired determination value, whether the printed product is an original printed product printed by a printing method using the plate or a counterfeit printed product printed by a printing method using the printer.

13. The determination system according to claim 1, wherein the imaging data acquisition device is a mobile phone or a digital camera including an image sensor that acquires the imaging data of an imaging image of the printed surface of the printed product.

14. The determination system according to claim 1, wherein the determination device
receives the imaging data acquired by the imaging data acquisition device via the Internet.

15. The determination system according to claim 1, wherein the determination device
transmits a determination result of a printing method used to produce the printed surface of the printed product to an external device via the Internet.

16. The determination system according to claim 1, wherein the determination device
transmits a determination result of a printing method used to produce the printed surface of the printed product to the imaging data acquisition device via the Internet.

17. The determination system according to claim 1, wherein the printed product is a certificate document such as a gift certificate, a bill, a driver's license, a basic resident registration card, a residence card, a special permanent resident certificate, a passport, a voucher, or an identification card.

18. A control method for a determination system including
an imaging data acquisition device that captures an image of a printed surface of a printed product to acquire imaging data of the captured image, and
a determination device that determines, based on the imaging data acquired by the imaging data acquisition device, a printing method used to produce the printed surface of the printed product for which the image is captured by the imaging data acquisition device, the control method comprising,
by the determination device:
selecting a determination area included in the captured image from the imaging data acquired by the imaging data acquisition device;
extracting a determination end image from a portion around an end portion of a black determination image included in the selected determination area;
acquiring difference data, the difference data being a difference in gradation between two colors among gradation data of RBG colors of the extracted determination end image;
acquiring, based on the acquired difference data, a determination value for determining a printing method used to produce the printed surface of the printed product; and
determining, based on the acquired determination value, a printing method used to produce the printed surface of the printed product.

19. The control method according to claim 18, wherein the printed product is a certificate document such as a gift certificate, a bill, a driver's license, a basic resident registration card, a residence card, a special permanent resident certificate, a passport, a voucher, or an identification card.

20. A determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device,
wherein the determination device
selects a determination area included in the captured image from the imaging data acquired by the imaging data acquisition device,
extracts a determination end image from a portion around an end portion of a black determination image included in the selected determination area,
acquires difference data, the difference data being a difference in gradation between two colors among gradation data of RBG colors of the extracted determination end image,
acquires, based on the acquired difference data, a determination value for determining a printing method used to produce the printed surface of the printed product, and
determines, based on the acquired determination value, a printing method used to produce the printed surface of the printed product.

21. The determination device according to claim 20, wherein the printed product is a certificate document such as a gift certificate, a bill, a driver's license, a basic resident registration card, a residence card, a special permanent resident certificate, a passport, a voucher, or an identification card.

22. A control method for a determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device, the control method comprising,
by the determination device:
selecting a determination area included in the captured image from the imaging data acquired by the imaging data acquisition device;
extracting a determination end image from a portion around an end portion of a black determination image included in the selected determination area;
acquiring difference data, the difference data being a difference in gradation between two colors among gradation data of RBG colors of the extracted determination end image;
acquiring, based on the acquired difference data, a determination value for determining a printing method used to produce the printed surface of the printed product; and
determining, based on the acquired determination value, a printing method used to produce the printed surface of the printed product.

23. The control method according to claim 22, wherein the printed product is a certificate document such as a gift certificate, a bill, a driver's license, a basic resident registration card, a residence card, a special permanent resident certificate, a passport, a voucher, or an identification card.

* * * * *